US012761428B2

(12) United States Patent
Zhang et al.

(10) Patent No.: US 12,761,428 B2
(45) Date of Patent: Oct. 13, 2026

(54) OPTICAL MODULE

(71) Applicant: HISENSE BROADBAND MULTIMEDIA TECHNOLOGIES CO., LTD., Qingdao (CN)

(72) Inventors: Jiaao Zhang, Qingdao (CN); Xinnan Wang, Qingdao (CN); Yuchen Shao, Qingdao (CN); Jianwei Mu, Qingdao (CN)

(73) Assignee: HISENSE BROADBAND MULTIMEDIA TECHNOLOGIES CO., LTD., Qingdao (CN)

( * ) Notice: Subject to any disclaimer, the term of this patent is extended or adjusted under 35 U.S.C. 154(b) by 260 days.

(21) Appl. No.: 18/476,010

(22) Filed: Sep. 27, 2023

(65) Prior Publication Data

US 2024/0027702 A1 Jan. 25, 2024

Related U.S. Application Data

(63) Continuation of application No. PCT/CN2022/078425, filed on Feb. 28, 2022.

(30) Foreign Application Priority Data

Nov. 12, 2021 (CN) ......................... 202111342027.5
Nov. 12, 2021 (CN) ......................... 202122784337.4

(51) Int. Cl.
*G02B 6/42* (2006.01)

(52) U.S. Cl.
CPC ......... *G02B 6/4219* (2013.01); *G02B 6/4204* (2013.01); *G02B 6/4257* (2013.01)

(58) Field of Classification Search
CPC ........................................................ G02B 6/42
(Continued)

(56) References Cited

U.S. PATENT DOCUMENTS 10,879,673 B2 * 12/2020 Raring ...................... F21K 9/64
11,437,775 B2 * 9/2022 Raring ................ H01S 5/02438
(Continued)

FOREIGN PATENT DOCUMENTS

CN 103782211 A 5/2014
CN 104335092 A * 2/2015 ........... G02B 6/4214
(Continued)

OTHER PUBLICATIONS

Chinese Patent Application No. 202311255248.8 Office Action dated Aug. 23, 2025, with English translation, 15 pages.
(Continued)

*Primary Examiner* — Kaveh C Kianni
(74) *Attorney, Agent, or Firm* — Cozen O'Connor

(57) ABSTRACT

An optical module includes an upper shell, a lower shell, a circuit board, a fixing frame, a light source emitter, a first optical fiber, a modulation chip, and a circuit sub-board. The lower shell is covered with the upper shell to form a mounting cavity. The circuit board is disposed in the mounting cavity. The light source emitter is fixedly connected to the fixing frame and configured to emit a light beam. The modulation chip is connected to the light source emitter through the first optical fiber and configured to load a signal into the light beam emitted by the light source emitter to form an optical signal. The circuit sub-board is disposed on a side of the circuit board proximate to the upper shell and fixedly connected to the fixing frame. The circuit sub-board is electrically connected to the circuit board and the light source emitter.

8 Claims, 11 Drawing Sheets

(58) Field of Classification Search
USPC ............................................................ 385/14
See application file for complete search history.

(56) References Cited

U.S. PATENT DOCUMENTS

| | | | | |
|---|---|---|---|---|
| 2012/0224817 | A1* | 9/2012 | Hayashi | H01S 5/0232 385/93 |
| 2013/0259423 | A1* | 10/2013 | Charbonneau-Lefort | G02B 6/4224 359/356 |
| 2014/0205248 | A1* | 7/2014 | Yamada | G02B 6/36 29/832 |
| 2015/0098125 | A1* | 4/2015 | Vorobeichik | H01S 3/094061 359/341.33 |
| 2015/0104177 | A1* | 4/2015 | Kato | H04B 10/40 398/79 |
| 2016/0308329 | A1* | 10/2016 | Ishii | G02B 6/4278 |
| 2017/0075188 | A1* | 3/2017 | Nakata | G02F 1/2255 |
| 2019/0033542 | A1* | 1/2019 | Epitaux | G02B 6/4226 |
| 2019/0323663 | A1* | 10/2019 | Rudy | H01S 5/0233 |
| 2020/0333539 | A1* | 10/2020 | Matsui | G02B 6/4249 |

FOREIGN PATENT DOCUMENTS

| | | | | | |
|---|---|---|---|---|---|
| CN | 106059672 | A | * | 10/2016 | G02B 6/4278 |
| CN | 106970445 | A | | 7/2017 | |
| CN | 111338039 | A | * | 6/2020 | G02B 6/428 |
| CN | 111722326 | A | | 9/2020 | |
| CN | 111722327 | A | | 9/2020 | |
| CN | 212647080 | U | | 3/2021 | |
| CN | 214174689 | U | | 9/2021 | |
| CN | 113467012 | A | | 10/2021 | |
| CN | 214623119 | U | | 11/2021 | |
| CN | 114035283 | A | | 2/2022 | |
| CN | 216526403 | U | | 5/2022 | |
| JP | 2008203427 | A | | 9/2008 | |
| JP | 2011095611 | A | * | 5/2011 | |
| JP | 2015079092 | A | * | 4/2015 | G02B 6/4246 |

OTHER PUBLICATIONS

International Search Report and Written Opinion dated Jul. 20, 2022 in corresponding International Application No. PCT/CN2022/078425, translated, 19 pages.

Chinese Notification of the First Office Action dated Sep. 5, 2022 in corresponding Chinese Application No. 202111342027.5, translated, 15 pages.

Chinese Notification of the Second Office Action dated Feb. 22, 2023 in corresponding Chinese Application No. 202111342027.5, translated, 12 pages.

Chinese Notification of Grant of Invention Patent Rights dated Aug. 1, 2023 in corresponding Chinese Application No. 202111342027.5, translated, 7 pages.

* cited by examiner

OPTICAL MODULE

CROSS-REFERENCE TO RELATED APPLICATIONS

This application is a continuation application of International Patent Application No. PCT/CN2022/078425, filed on Feb. 28, 2022, which claims priority to Chinese Patent Application No. 202111342027.5, filed on Nov. 12, 2021, and Chinese Patent Application No. 202122784337.4, filed on Nov. 12, 2021, which are incorporated herein by reference in their entireties.

TECHNICAL FIELD

The present disclosure relates to the field of optical fiber communication technologies and, in particular, to an optical module.

BACKGROUND

With the development of new services and application scenarios such as cloud computing, mobile Internet, and video conference, the development and progress of optical communication technology has become increasingly important. In the optical communication technology, an optical module is a tool for achieving interconversion between an optical signal and an electrical signal and is one of the key devices in an optical communication equipment. Moreover, with the development of optical communication technology, a transmission rate of the optical module is continuously increasing.

With the miniaturization of devices, the optoelectronic devices inside the optical module are more closely distributed and occupy less space.

SUMMARY

In one aspect, an optical module is provided. The optical module includes an upper shell, a lower shell, a circuit board, a fixing frame, a light source emitter, a first optical fiber, a modulation chip, and a circuit sub-board. The lower shell is covered with the upper shell to form a mounting cavity. The circuit board is disposed in the mounting cavity. The light source emitter is fixedly connected to the fixing frame and configured to emit a light beam. The modulation chip is connected to the light source emitter through the first optical fiber and configured to load a signal into the light beam emitted by the light source emitter, so as to form an optical signal. The circuit sub-board is disposed on a side of the circuit board proximate to the upper shell and fixedly connected to the fixing frame. The circuit sub-board is electrically connected to the circuit board and the light source emitter.

In another aspect, an optical module is provided. The optical module includes an upper shell, a lower shell, a circuit board, a light source mounting portion, a supporting column, a pressing plate, and a light source emitter. The lower shell is covered with the upper shell to form a mounting cavity. The circuit board is disposed in the mounting cavity. The light source mounting portion is fixedly connected to the upper shell. The supporting column is located at a side of the light source mounting portion proximate to the lower shell and connected to the light source mounting portion. The pressing plate is closer to the lower shell than the base. The pressing plate includes a connecting portion and a second connecting portion. The first connecting portion is connected to the supporting column. The second connecting portion is connected to the first connecting portion, and the second connecting portion is closer to the upper shell than the first connecting portion. The light source emitter is disposed between the second connecting portion and the base.

BRIEF DESCRIPTION OF THE DRAWINGS

In order to illustrate the technical solutions of the embodiments of the present disclosure more clearly, accompanying drawings to be used in the description of some embodiments will be introduced briefly below. However, the accompanying drawings to be described below are merely accompanying drawings of some embodiments of the present disclosure, and a person having ordinary skill in the art may obtain other drawings according to these drawings without creative effort.

DETAILED DESCRIPTION

Figure 1:
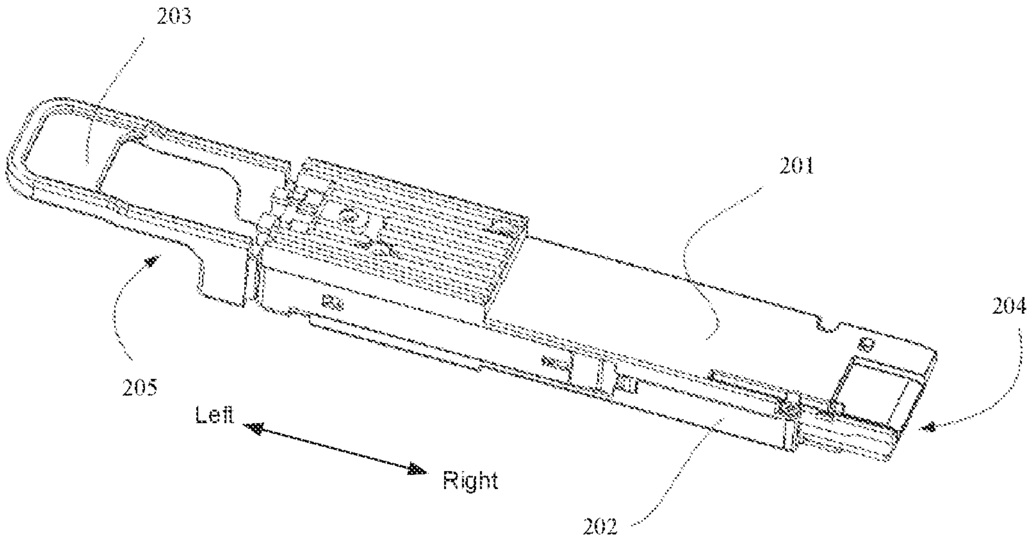
FIG. 1 is a structural diagram of an optical module, in accordance with some embodiments.

Some embodiments of the present disclosure will be clearly and completely described below with reference to the accompanying drawings. However, the described embodiments are merely some but not all of embodiments of the present disclosure. All other embodiments obtained by a person of ordinary skill in the art based on embodiments of the present disclosure shall be included in the protection scope of the present disclosure.

Unless the context requires otherwise, throughout the description and the claims, the term "comprise" is construed as an open and inclusive meaning, i.e., "including, but not limited to." The terms such as "first" and "second" are not to be construed as indicating or implying the relative importance or indicating the upper limit of the number. The terms "a plurality of" or "the plurality of" means two or more. The term "connected" should be understood in a broad sense. For example, the term "connected" may represent a fixed connection, a detachable connection, or a one-piece connection, or may represent a direct connection, or may represent an indirect connection through an intermediate medium. The use of the phase "applicable to" or "configured to" herein means an open and inclusive expression, which does not exclude devices that are applicable to or configured to perform additional tasks or steps. The terms such as "parallel," "perpendicular," "same," "consistent," and "flush," are not limited to absolute mathematical theoretical relationships but also includes acceptable error ranges generated in practice, as well as differences based on the same design conception but due to manufacturing reasons.

In the optical communication technology, in order to establish information transmission between information processing equipment, it is necessary to load information into the light and use the propagation of the light in information transmission equipment to achieve information transmission. Here, the light loaded with information is an optical signal. The information processing equipment usually includes optical network units, optical line terminal, gateways, routers, switches, servers, etc. The information transmission equipment usually includes optical fibers, optical waveguides, etc.

The signal that the information processing equipment can recognize and process is an electrical signal. An optical module is configured to achieve mutual conversion of optical signals and electrical signals between the information processing equipment and the information transmission equipment. The information processing equipment directly connected to the optical module is called a master monitor of the optical module. One-way electrical signal connection or bidirectional electrical signal connection between the master monitor and the optical module is established.

A first optical signal from remote information processing equipment is transmitted to the optical module through the optical fiber. The optical module converts the first optical signal into a first electrical signal. The optical module transmits the first electrical signal to the master monitor. A second electrical signal from the master monitor is transmitted to the optical module, the optical module converts the second electrical signal into a second optical signal and transmits the second optical signal to the optical fiber. The second optical signal is transmitted to the remote information processing equipment through the optical fiber. During the conversion process of the above optical signal and electrical signal, the information does not change, and the encoding and decoding methods of information may change.

Figure 2:
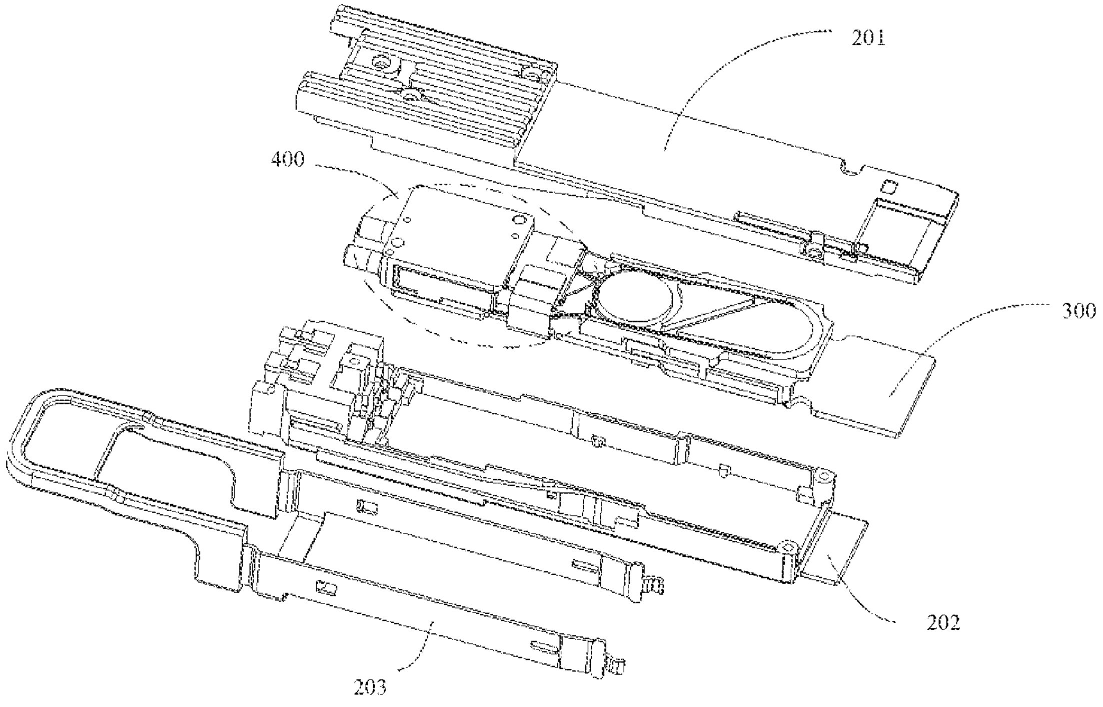
FIG. 2 is an exploded view of an optical module, in accordance with some embodiments.

FIG. 1 is a structural diagram of an optical module, in accordance with some embodiments; and FIG. 2 is an exploded view of an optical module, in accordance with some embodiments. As shown in FIGS. 1 and 2, the optical module 200 includes a shell and a circuit board 300 disposed in the shell.

The shell includes an upper shell 201 and a lower shell 202. The upper shell 201 is covered on the lower shell 202, so as to form a mounting cavity having two openings 204 and 205. The circuit board 300 is disposed in the mounting cavity. An outer contour of the shell 200A is generally in a cuboid shape.

A direction in which a connecting line between the two openings 204 and 205 is located may be the same as a length direction of the optical module 200 or may not be the same as the length direction of the optical module 200. For example, the opening 204 is located at an end (e.g., the right end in FIG. 1) of the optical module 200, and the opening 205 is also located at an end (e.g., the left end in FIG. 1) of the optical module 200. Alternatively, the opening 204 is located at an end of the optical module 200, and the opening 205 is located at a side of the optical module 200. The opening 204 is an electrical port, and a connecting finger of the circuit board 300 extends from the electrical port 204 and is inserted into an electrical connector of the master monitor. The opening 205 is an optical port and configured to connect to an external optical fiber.

By using an assembly manner of combining the upper shell 201 with the lower shell 202, it may be conducive to forming encapsulation and protection for the assemblies inside the shell. In some embodiments, the upper shell 201 and the lower shell 202 are made of a metal material, which is conducive to electromagnetic shielding and heat dissipation.

In some embodiments, as shown in FIGS. 1 and 2, the optical module 200 further includes an unlocking assembly 203 located outside the shell thereof. The unlocking assembly 203 is configured to implement a fixed connection between the optical module 200 and the master monitor or to release a fixed connection between the optical module 200 and the master monitor.

The circuit board 300 includes circuit wirings, electronic elements, and chips, and the electronic elements and the chips are connected according to a circuit design through the circuit wirings, so as to implement functions such as power supply, transmission of the electrical signal, and grounding. The electronic element includes, for example, a capacitor, a resistor, a triode, and a metal-oxide-semiconductor field-effect transistor. The chips include, for example, a micro-controller unit, a laser driving chip, a transimpedance amplifier, a limiting amplifier, a clock and data recovery chip, or a digital signal processing chip.

The circuit board 300 is generally a rigid circuit board. Due to the relatively hard material of the rigid circuit board, the rigid circuit board may also achieve bearing effects. The circuit board 300 further includes a connecting finger formed on a surface of an end thereof, and the connecting finger is composed of a plurality of independent pins. The circuit board 300 is inserted into the master monitor, and the circuit board 300 is conducted with the electrical connector in the master monitor through the connecting finger. The connecting finger may be disposed on a surface (e.g., an upper surface shown in FIG. 2) of the circuit board 300. Alternatively, the connecting finger may also be disposed on both upper and lower surfaces of the circuit board 300 to provide a larger number of pins, so as to adapt to an occasion where a large number of pins are needed. The connecting finger is configured to establish an electrical connection with the master monitor, so as to implement power supply, grounding, inter-integrated circuit (I2C) signal transmission, and data signal transmission. Of course, flexible circuit boards are also used in some optical modules. The flexible circuit board is generally used in conjunction with the rigid circuit board as a supplement to the rigid circuit board.

Figure 3:
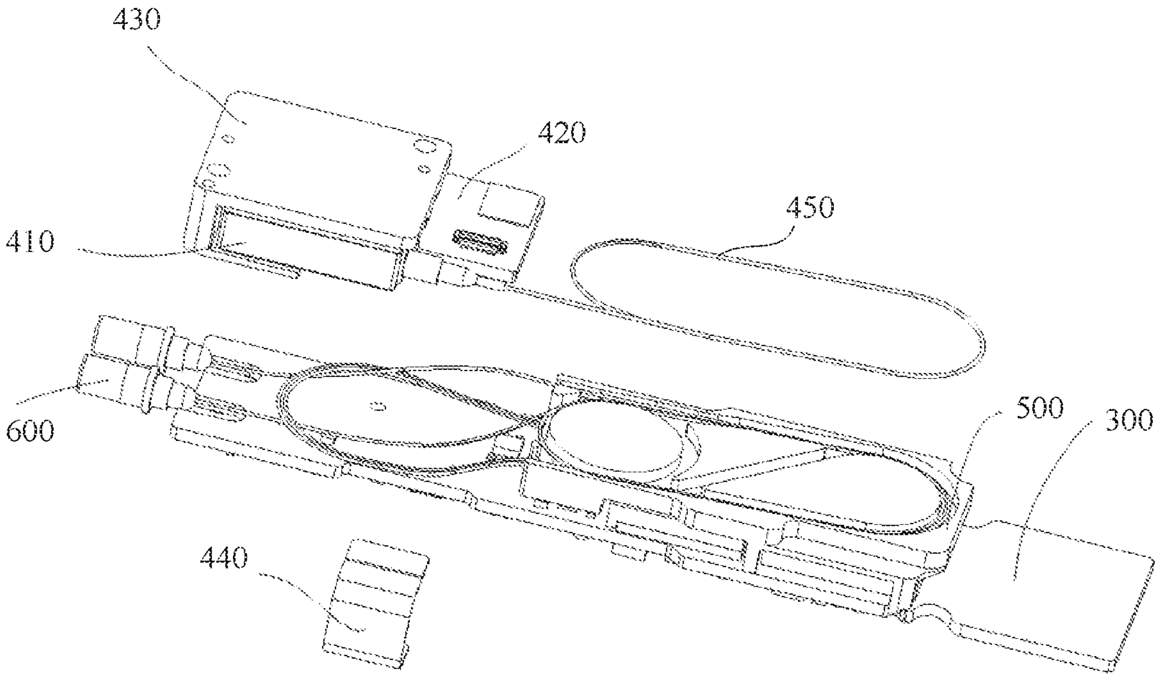
FIG. 3 is an exploded view of a light source emitter and a circuit board of an optical module, in accordance with some embodiments.
Figure 4:
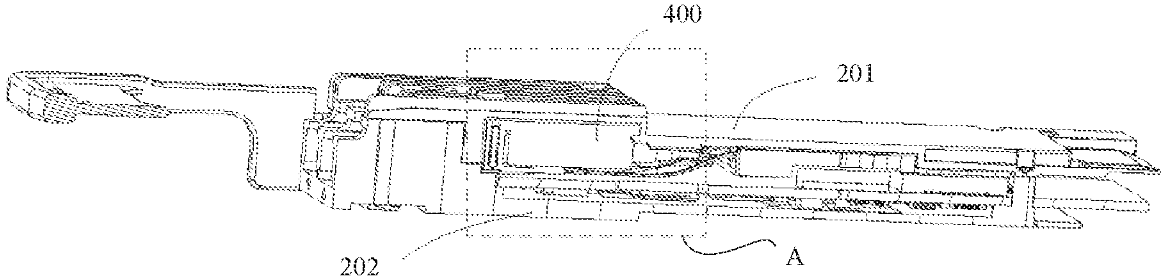
FIG. 4 is a cross-sectional diagram of an optical module, in accordance with some embodiments.

FIG. 3 is an exploded view of a light source emitter and a circuit board of an optical module, in accordance with some embodiments; FIG. 4 is a cross-sectional diagram of an optical module, in accordance with some embodiments; and FIG. 5 is an enlarged view of box A in FIG. 4.

Figure 5:
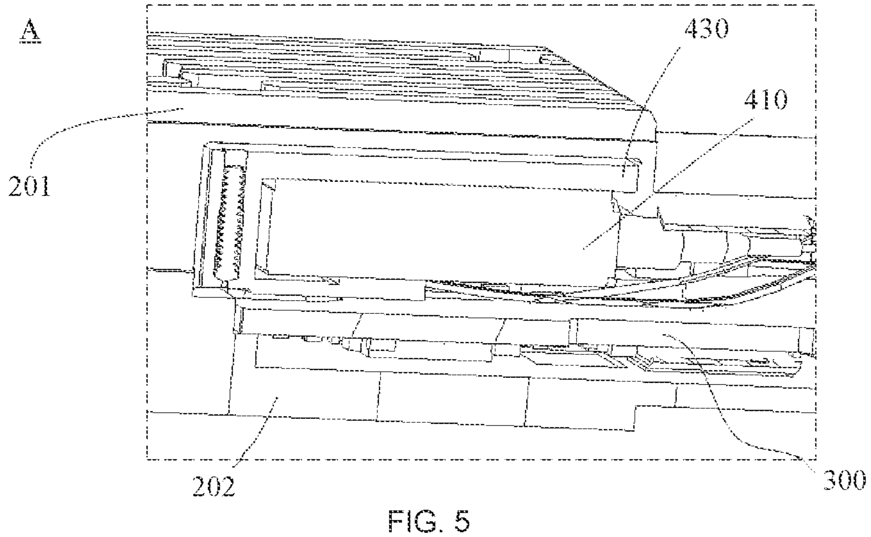
FIG. 5 is an enlarged view of box A in FIG. 4.

In some embodiments, as shown in FIGS. 3 to 5, the optical module 200 further includes a light source emitter 410, a circuit sub-board 420, a fixing frame 430, a flexible circuit board 440, and a first optical fiber 450.

The fixing frame 430 is disposed above the circuit board 300 and located between the circuit board 300 and the upper shell 201. The fixing frame 430 is fixedly connected to the upper shell 201 and configured to fix the light source emitter 410.

The light source emitter 410 is fixedly connected to the fixing frame 430 and fixed relative to the upper shell 201. The light source emitter 410 is provided proximate to the opening 205 and connected to an end of the first optical fiber 450. The light source emitter 410 is configured to emit a light beam.

It can be understood that the fixing frame 430 is fixedly connected to the upper shell 201, and in this way, the heat generated by the light source emitter 410 during operation may be transferred to the fixing frame 430 and then transferred to the upper shell 201 through the fixing frame 430, so that the heat generated by the light source emitter 410 is transferred to an outside of the optical module 200, thereby improving heat dissipation performance of the optical module 200.

The circuit sub-board 420 is located above the circuit board 300 and is electrically connected to the circuit board 300 through the flexible circuit board 440. The light source emitter 410 includes a plurality of pins 411 (see FIG. 11), and the circuit sub-board 420 is electrically connected to the light source emitter 410 through the plurality of pins 411. The circuit sub-board 420 is configured to drive optoelectronic devices inside the light source emitter 410, so as to make the light source emitter 410 emit a light beam.

In some embodiments, an orthogonal projection of the light source emitter 410 on the circuit board 300 is generally rectangular, and the plurality of pins 411 are disposed along a long side of the light source emitter 410, which is conducive to improving reliability of the electrical connection between the light source emitter 410 and the circuit sub-board 420.

In some embodiments, light source emitter 410 may serve as a light source and be configured to emit a light beam without a signal. In this case, the optical module 200 further includes a modulation chip 460 (see FIG. 6). The modulation chip 460 is disposed on the circuit board 300 and connected to another end of the first optical fiber 450. The modulation chip 460 is configured to receive the light beam emitted by the light source emitter 410 and load a signal into the light beam, so as to form an optical signal. For example, the modulation chip 460 includes a silicon optical chip or an indium phosphorus chip.

Figure 6:
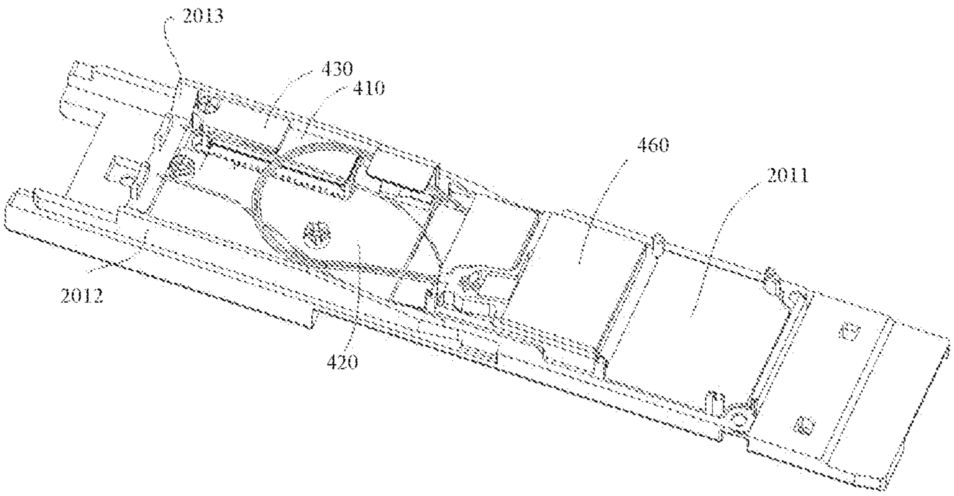
FIG. 6 is a structural diagram of an upper shell and a light source emitter of an optical module, in accordance with some embodiments.
Figure 7:
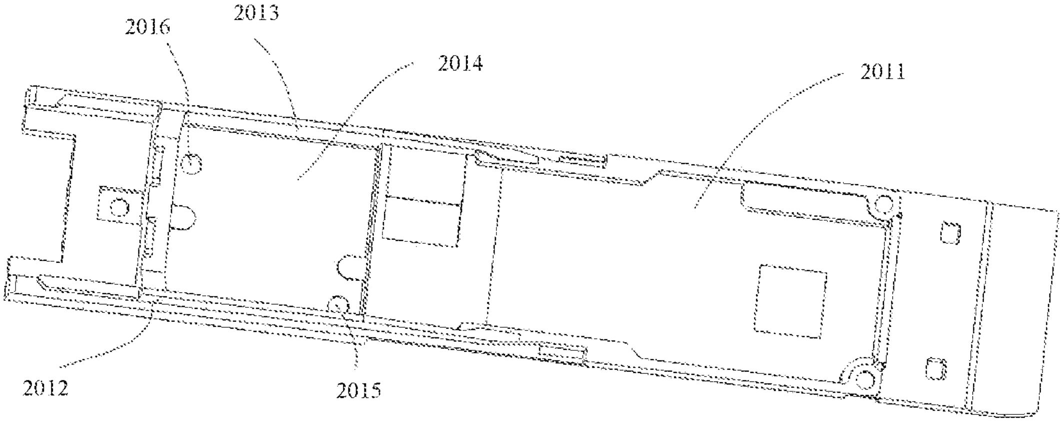
FIG. 7 is a structural diagram of an upper shell of an optical module, in accordance with some embodiments.

FIG. 6 is a structural diagram of an upper shell and a light source emitter of an optical module, in accordance with some embodiments; FIG. 7 is a structural diagram of an upper shell of an optical module, in accordance with some embodiments; and FIG. 8 is a structural diagram of a light source emitter and a fixing frame of an optical module, in accordance with some embodiments.

Figure 8:
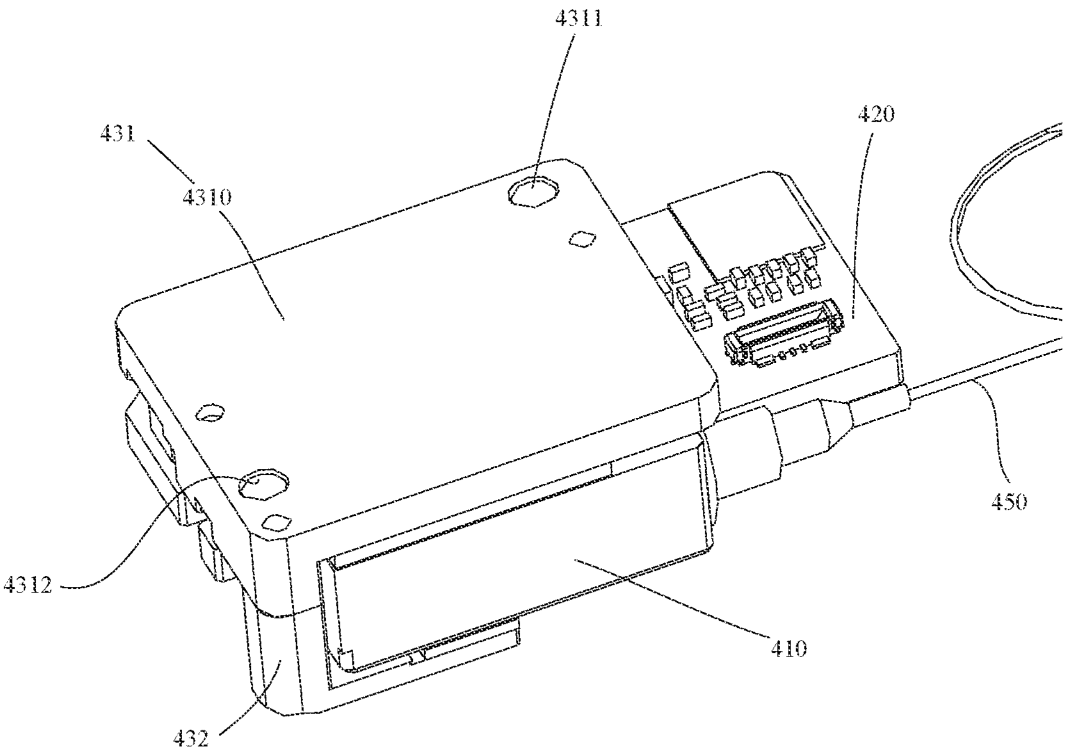
FIG. 8 is a structural diagram of a light source emitter and a fixing frame of an optical module, in accordance with some embodiments.

In some embodiments, as shown in FIGS. 6 to 8, the upper shell 201 includes a cover plate 2011, a first upper side plate 2012, a second upper side plate 2013, and a bracket mounting groove 2014. The first upper side plate 2012 and the second upper side plate 2013 are respectively located on both sides of the cover plate 2011 in a width direction of the cover plate 2011 and perpendicular to the cover plate 2011.

The bracket mounting groove 2014 is formed on the cover plate 2011. The bracket mounting groove 2014 is recessed, relative to a surface of the cover plate 2011 proximate to the lower shell 202, towards a direction away from the lower shell 202. An inner contour of the bracket mounting groove 2014 matches a surface of the fixing frame 430 proximate to the upper shell 201. The fixing frame 430 is installed in the bracket mounting groove 2014.

In some embodiments, referring to FIG. 7, the upper shell 201 further includes a first fixing hole 2015 and a second fixing hole 2016 that are located in the bracket mounting groove 2014 and run through the cover plate 2011 along a thickness direction of the cover plate 2011. Referring to FIG. 8, the fixing frame 430 includes a first connecting through hole 4311 and a second connecting through hole 4312. Positions of the first connecting through hole 4311 and the second connecting through hole 4312 correspond to positions of the first fixing hole 2015 and the second fixing hole 2016, respectively. A fastener passes through the corresponding first connecting through hole 4311 and first fixing hole 2015, and a fastener passes through the second connecting through hole 4312 and second fixing hole 2016, so that the fixation between the fixing frame 430 and the upper shell 201 may be implemented.

For example, the bracket mounting groove 2014 is generally rectangular. The first fixing hole 2015 is located at a first corner of the bracket mounting groove 2014 and corresponds to the position of the first connecting through hole 4311. The second fixing hole 2016 is located at a second corner of the bracket mounting groove 2014 and corresponds to the position of the second connecting through hole 4312. The first corner of the bracket mounting groove 2014 is diagonal to the second corner. In this way, when the first connecting through hole 4311 and the first fixing hole 2015 are fixed through a fastener (e.g., a screw), and the second connecting through hole 4312 and the second fixing hole 2016 are fixed through a fastener (e.g., a screw), it is conducive to improving the stability and reliability of the connection between the fixing frame 430 and the upper shell 201.

For example, the first fixing hole 2015, the second fixing hole 2016, the first connecting through hole 4311, and the second connecting through hole 4312 may be threaded holes. In this way, the screws pass through the first connecting through hole 4311 and the first fixing hole 2015 and pass through the second connecting through hole 4312 and the second fixing hole 2016, thereby implementing the connection between the fixing frame 430 and the upper shell 201.

It will be noted that some embodiments of the present disclosure are not limited to fixing the fixing frame 430 on the upper shell 201. In some embodiments, the fixing frame 430 may also be disposed on the lower shell 202. In this case, the bracket mounting groove 2014 may be formed on the bottom plate 2021, and the fixing frame 430 is disposed in the bracket mounting groove 2014 and fixedly connected to the bottom plate 2021 through fasteners.

Figure 9:
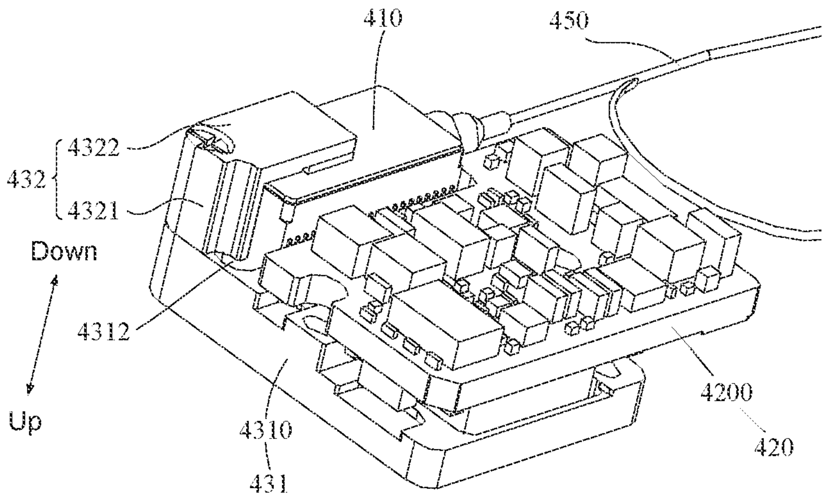
FIG. 9 is a structural diagram of a light source emitter and a fixing frame without a base of an optical module, in accordance with some embodiments.
Figure 10:
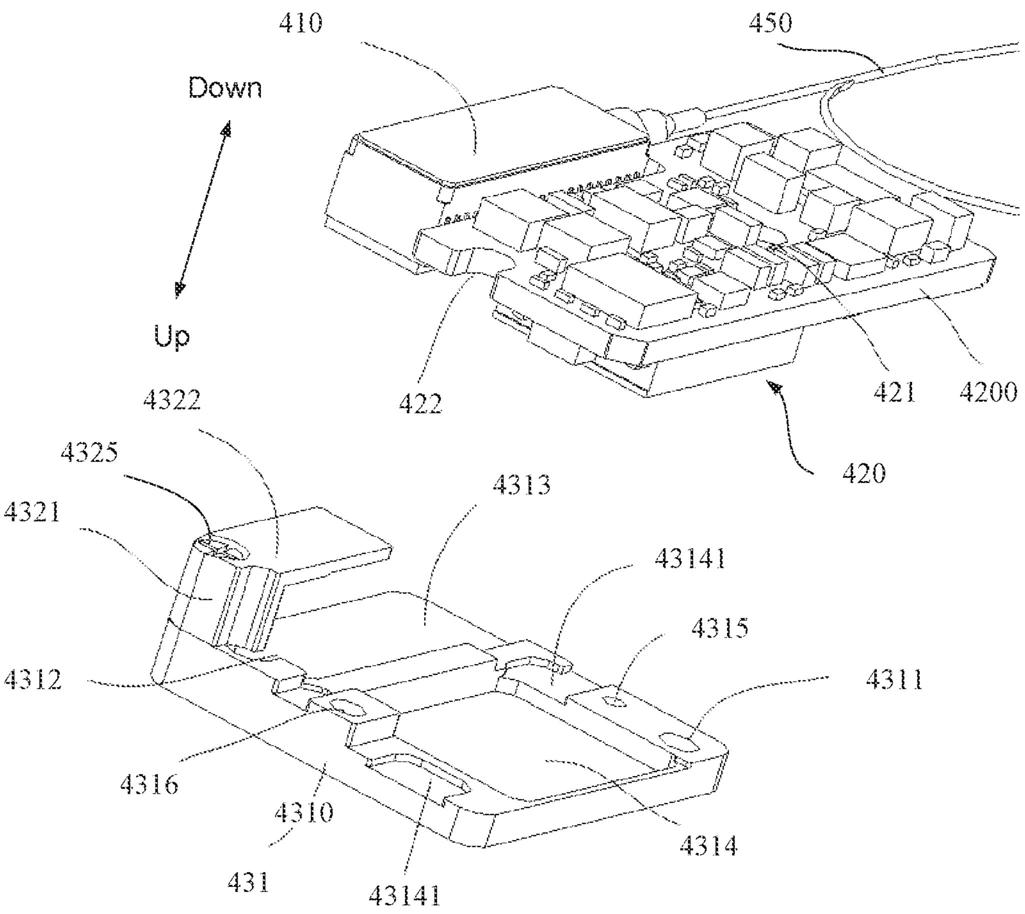
FIG. 10 is an exploded view of a light source emitter and a fixing frame of an optical module, in accordance with some embodiments.

FIG. 9 is a structural diagram of a light source emitter and a fixing frame without a base of an optical module, in accordance with some embodiments; and FIG. 10 is an exploded view of a light source emitter and a fixing frame of an optical module, in accordance with some embodiments.

In some embodiments, as shown in FIGS. 9 and 10, the fixing frame 430 includes a base 431 and a bracket 432. A surface of the light source emitter 410 proximate to the upper shell 201 (e.g., an upper surface) is connected to the base 431, and a surface of the light source emitter 410 away from the upper shell 201 (e.g., a lower surface) is connected to the bracket 432.

For example, the upper surface of the light source emitter 410 abuts against the base 431, and the lower surface of the light source emitter 410 abuts against the bracket 432, so as to implement fixation of the light source emitter 410.

The base 431 has a structure in a shape of a rectangle. A surface of the base 431 proximate to the upper shell 201 (e.g., an upper surface) has a planar structure and is configured to be fixedly connected to the upper shell 201. A surface of the base 431 away from the upper shell 201 (e.g., a lower surface) is configured to fix and install the light source emitter 410 and the circuit sub-board 420.

The bracket 432 includes a supporting column 4321 and a pressing plate 4322. The supporting column 4321 is disposed at a lower side of the base 431 and located at a side of the light source emitter 410. An end of the supporting column 4321 is fixedly connected to the base 431, and another end of the supporting column 4321 is connected to the pressing plate 4322. A surface of the pressing plate 4322 facing towards the base 431 is connected (e.g., abutting against) to the light source emitter 410, so as to fix the light source emitter 410 between the pressing plate 4322 and the base 431. In addition, the heat generated by the light source emitter 410 may be directly conducted to the upper shell 201 through the base 431 for heat dissipation.

In some embodiments, as shown in FIG. 10, the base 431 further includes a light source mounting portion 4313 disposed on the lower surface of the base 431 and matched with the light source emitter 410. The light source mounting portion 4313 is configured to install the light source emitter 410, so as to facilitate positioning the light source emitter 410 on the base 431.

In some embodiments, as shown in FIG. 10, the base 431 further includes a fixing portion 4314 disposed on the lower surface of the base 431 and located on a side of the light source mounting portion 4313. The fixing portion 4314 is matched with the circuit sub-board 420 and configured to be fixedly connected to the circuit sub-board 420.

For example, at least a portion of the fixing portion 4314 is groove-shaped and is recessed from the lower surface of the base 431 towards the upper surface of the base 431. An inner contour of the fixing portion 4314 is matched with an outer contour of the circuit sub-board 420, and the circuit sub-board 420 is fixedly installed in the fixing portion 4314. In this way, the positioning of the circuit sub-board 420 on the base 431 may be facilitated.

In some embodiments, as shown in FIG. 10, the fixing portion 4314 includes a plurality of recessed portions 43141. The circuit sub-board 420 includes a plurality of electronic components disposed on the upper surface and the lower surface of the circuit board 420. The plurality of recessed portions 43141 are configured to avoid the plurality of electronic components. In this way, after the circuit sub-board 420 is fixedly installed in the fixing portion 4314, the circuit sub-board 420 may be substantially parallel to the circuit board 300.

It will be noted that sizes and heights of the plurality of electronic components on the circuit sub-board 420 may not be exactly the same. In this case, depths and areas of the plurality of recessed portions 43141 may not be exactly the same. Any one of the plurality of recessed portions 43141 is matched with a corresponding electronic component. In this way, after the circuit sub-board 420 is fixedly installed in the fixing portion 4314, the circuit sub-board 420 may be substantially parallel to the circuit board 300.

In some embodiments, as shown in FIG. 10, the base 431 further includes a base body 4310 and a third connecting through hole 4315. The third connecting through hole 4315 runs through the base body 4310 along a thickness direction of the base body 4310 and is located on a side of the fixing portion 4314.

Correspondingly, the circuit sub-board 420 further includes a circuit sub-board body 4200 and a third fixing hole 421. The third fixing hole 421 runs through the circuit sub-board body 4200 along a thickness direction of the circuit sub-board body 4200. A position of the third fixing hole 421 corresponds to a position of the third connecting through hole 4315. A fastener passes through the third fixing hole 421 and the third connecting through hole 4315, so that the circuit sub-board 420 is fixedly connected to the base 431.

In some embodiments, the base 431 further includes a fourth connecting through hole 4316. The fourth connecting through hole 4316 runs through the base body 4310 along the thickness direction of the base body 4310 and is located at another side of the fixing portion 4314 opposite to the side of the fixing portion 4314.

Correspondingly, the circuit sub-board 420 further includes a fourth fixing hole 422. The fourth fixing hole 422 runs through the circuit sub-board body 4200 along the thickness direction of the circuit sub-board body 4200. A position of the fourth fixing hole 422 corresponds to a position of the fourth connecting through hole 4316. A fastener passes through the fourth fixing hole 422 and the fourth connecting through hole 4316, so that the circuit sub-board 420 is fixedly connected to the base 431.

It can be understood that the third fixing hole 421 is fixedly connected to the third connecting through hole 4315 through the screw, and the fourth fixing hole 422 is fixedly connected to the fourth connecting through hole 4316 through the screw. Therefore, it is convenient to achieve the connection between the circuit sub-board 420 and the fixing frame 430.

In some embodiments, the third fixing hole 421 and the fourth fixing hole 422 are disposed at diagonal positions of the circuit sub-board 420. In this way, in a case where the third fixing hole 421 is fixedly connected to the third connecting through hole 4315 through the fastener, and the fourth fixing hole 422 is fixedly connected to the fourth connecting through hole 4316 through the fastener, it is conducive to improving the stability and the reliability of the connection between the circuit sub-board 420 and the fixing frame 430.

Figure 11:
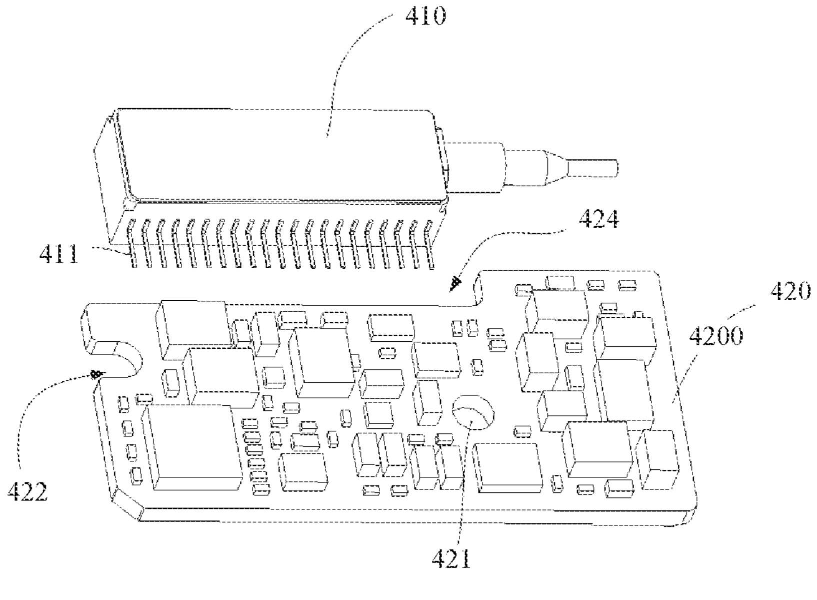
FIG. 11 is an exploded view of a circuit sub-board and a light source emitter of an optical module, in accordance with some embodiments.

FIG. 11 is an exploded view of a circuit sub-board and a light source emitter of an optical module, in accordance with some embodiments.

In some embodiments, as shown in FIGS. 10 and 11, the third fixing hole 421 or the fourth fixing hole 422 may be a closed hole (e.g., a circular through hole) or an open hole.

Considering the circuit sub-board 420 in FIGS. 10 and 11 as an example, the third fixing hole 421 is a circular through hole, and the fourth fixing hole 422 is an open hole.

In some embodiments, as shown in FIGS. 10 and 11, the circuit sub-board 420 further includes an avoidance portion 424 in a shape of a notch. The avoidance portion 424 runs through the circuit sub-board body 4200 along the thickness direction of the circuit sub-board body 4200 and is open towards the light source emitter 410.

The light source emitter 410 is disposed at the avoidance portion 424. An end of the light source emitter 410 proximate to the opening 205 is in contact with the supporting column 4321, and an end of the light source emitter 410 away from the opening 205 is in contact with a position of the circuit sub-board 420 where the avoidance portion 424 is provided. The light source emitter 410 is connected to the circuit sub-board 420 through the plurality of pins 411. For example, the light source emitter 410 is connected to a surface of the circuit sub-board 420 proximate to the upper shell 201 through the plurality of pins 411.

In some embodiments, the plurality of pins 411 are located at a side of the light source emitter 410 proximate to the circuit sub-board 420, so that a distance between the light source emitter 410 and the circuit sub-board 420 may be shortened, and lengths of the plurality of pins 411 may be shortened. Thus, the stability of the connection between the light source emitter 410 and the circuit sub-board 420 may be improved.

Figure 12:
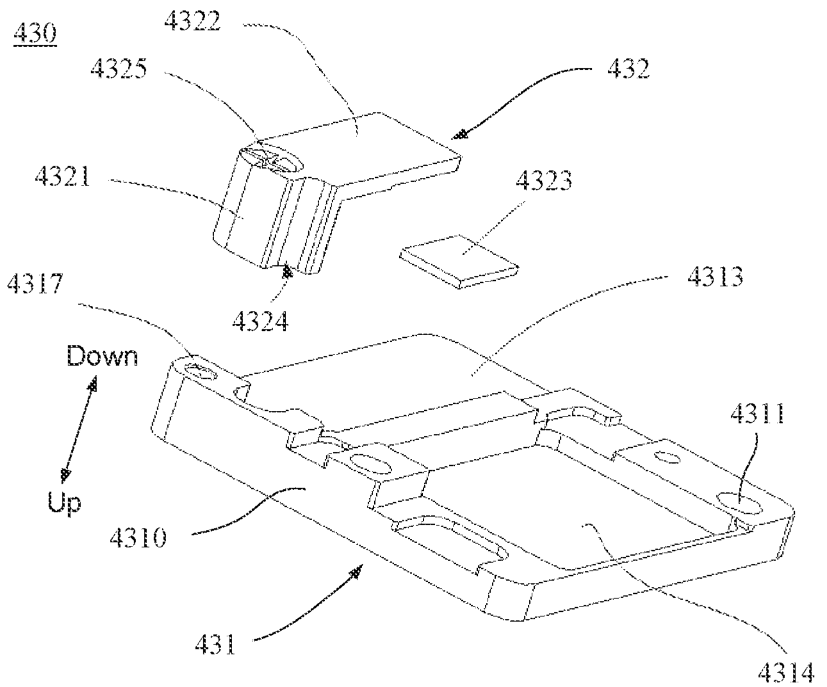
FIG. 12 is an exploded view of a fixing frame of an optical module, in accordance with some embodiments.
Figure 13:
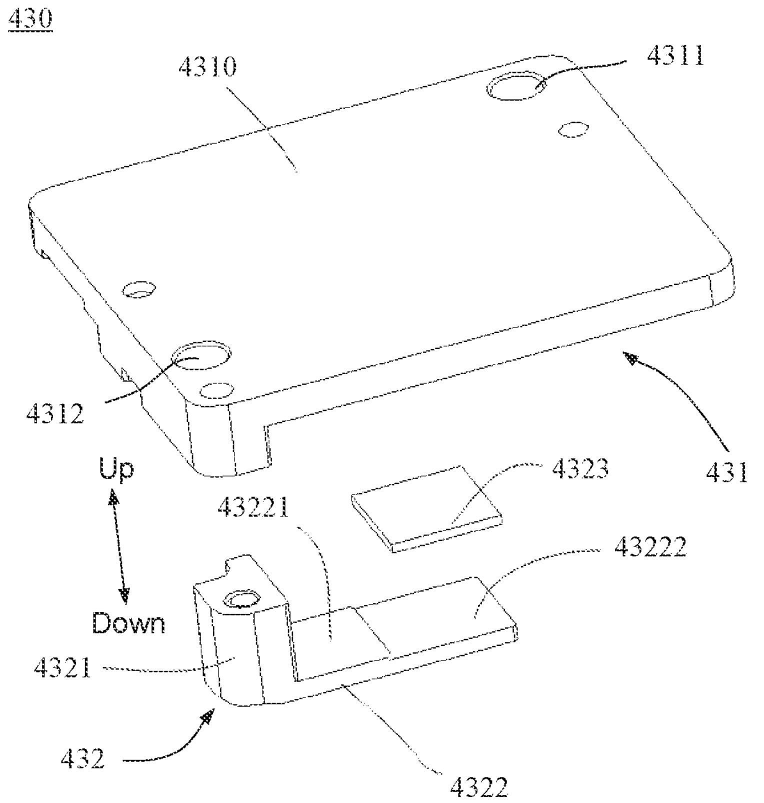
FIG. 13 is an exploded view of a fixing frame of an optical module from another perspective, in accordance with some embodiments.

FIG. 12 is an exploded view of a fixing frame of an optical module, in accordance with some embodiments; and FIG. 13 is an exploded view of a fixing frame of an optical module from another perspective, in accordance with some embodiments.

In some embodiments, as shown in FIGS. 12 and 13, the supporting column 4321 and the pressing plate 4322 are an integral member, and the base 431 and the bracket 432 are separate piece members. The bracket 432 further includes a first threaded hole 4325. The first threaded hole 4325 is disposed in the supporting column 4321 and runs through the supporting column 4321 along an axial direction of the supporting column 4321. The base 431 further includes a connecting hole 4317. A position of the connecting hole 4317 corresponds to a position of the first threaded hole 4325. A screw passes through the first threaded hole 4325 and the connecting hole 4317, so as to implement the fixed connection between the base 431 and the bracket 432.

The process of installing the light source emitter 410 into the optical module 200 will be described below.

The screw passes through the third connecting through hole 4315 and the third fixing hole 421, and the screw passes through the fourth connecting through hole 4316 and the fourth fixing hole 422.

The light source emitter 410 is installed between the pressing plate 4322 and the light source mounting portion 4313, and then the screw passes through the first threaded hole 4325 and the connecting hole 4317, so that the base 431 and the supporting column 4321 may be fixedly connected, and the light source emitter 410 may be fixed on the base 431 through the pressing plate 4322.

The base 431 is installed in the bracket mounting groove 2014, and the screw passes through the first connecting through hole 4311 and the first fixing hole 2015, and the screw passes through the second connecting through hole 4312 and the second fixing hole 2016, so that the fixation of the fixing frame 430 and the upper shell 201 may be achieved.

It can be understood that the fixation of the light source emitter 410 inside the optical module 200 may be achieved through fixing the light source emitter 410 on the fixing frame 430 and then fixing the fixing frame 430 on the upper shell 201. In addition, the light source emitter 410 is connected to the upper shell 201 through the base 431, so that the heat generated by the light source emitter 410 may be transferred to the upper shell 201 through the base 431, thereby improving the heat dissipation effect of the light source emitter 410.

In some embodiments, a material of the base 431 includes, but is not limited to, tungsten copper, Kovar alloy, steel plate cold rolled commercial (SPCC), copper, etc. In this way, the base 431 has a good thermal conductivity, thereby facilitating transferring the heat generated by the light source emitter 410 to the upper shell 201.

In some embodiments, as shown in FIGS. 12 and 13, the pressing plate 4322 includes a first connecting portion 43221 and a second connecting portion 43222. The first connecting portion 43221 is disposed between the second connecting portion 43222 and the supporting column 4321 and is connected to the second connecting portion 43222 and the supporting column 4321.

The bracket 432 further includes a spacer 4323. A surface (e.g., an upper surface) of the spacer 4323 is in contact with the second connecting portion 43222, and another surface (e.g., a lower surface) of the spacer 4323 is in contact with the light source emitter 410.

In some embodiments, a surface of the second connecting portion 43222 proximate to the upper shell 201 (e.g., an upper surface) is further away from the upper shell 201 than a surface of the first connecting portion 43221 proximate to the upper shell 201 (e.g., an upper surface). Therefore, a step is formed between the first connecting portion 43221 and the second connecting portion 43222. An end of the spacer 4323 is in contact with the step, thereby facilitating the positioning of the spacer 4323 on the second connecting portion 43222.

In some embodiments, the upper surface of the second connecting portion 43222 is closer to the upper shell 201 than the upper surface of the first connecting portion 43221. In this case, the spacer 4323 is disposed between the second connecting portion 43222 and the light source emitter 410.

In some embodiments, the spacer 4323 may be omitted. In this case, the second connecting portion 43222 abuts against the light source emitter 410.

In some embodiments, the upper surface of the spacer 4323 is closer to the upper shell 201 than the upper surface of the first connecting portion 43221. In this way, in a case where the light source emitter 410 abuts against the spacer 4323, there is a certain gap between the light source emitter 410 and the first connecting portion 43221. Therefore, in a case where the supporting column 4321 and the base 431 are fixed through the screws, direct contact between the light source emitter 410 and the pressing plate 4322 may be avoided, thereby avoiding damage to the light source emitter 410 or breakage of the pressing plate 4322 due to the direct contact between the light source emitter 410 and the pressing plate 4322.

The process of fixing the light source emitter 410 on the base 431 through the pressing plate 4322 will be described in detail below.

The light source emitter 410 is installed between the pressing plate 4322 and the light source mounting portion 4313, and the spacer 4323 is installed between the pressing plate 4322 and the light source emitter 410.

The first threaded hole 4325 and the connecting hole 4317 are fixedly connected through the screw, so that the fixed connection between the base 431 and the supporting column 4321 is implemented, and the light source emitter 410 may be fixed on the base 431 through the pressing plate 4322 and the spacer 4323.

It will be noted that in a case where the light source emitter 410 needs to be disassembled from the base 431, the screw used to connect the supporting column 4321 and the base 431 is unscrewed, and a distance between the pressing plate 4322 and the light source emitter 410 increased, so that the spacer 4323 may be taken out and the connection between the light source emitter 410 and the base 431 is released. Therefore, when repairing or replacing the light source emitter 410, the light source emitter 410 can be removed conveniently and quickly by simply loosening the screw.

Figure 14:
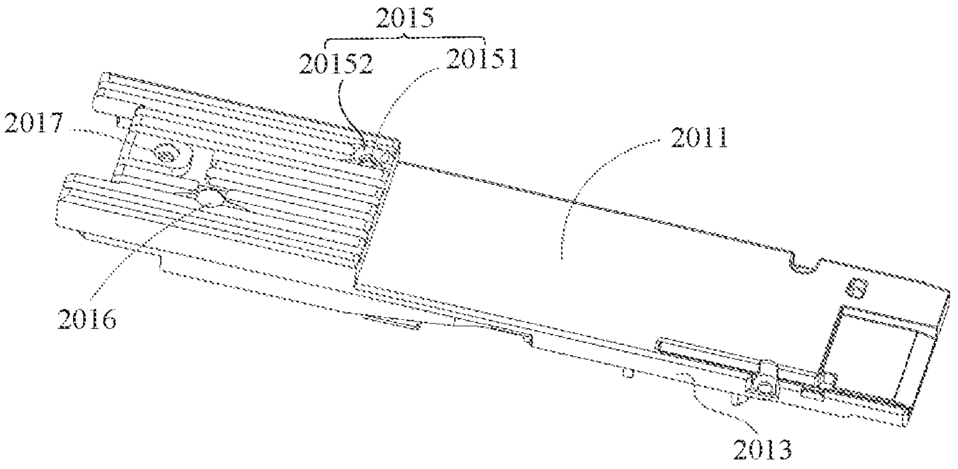
FIG. 14 is a structural diagram of an upper shell of an optical module from another perspective, in accordance with some embodiments.
Figure 15:
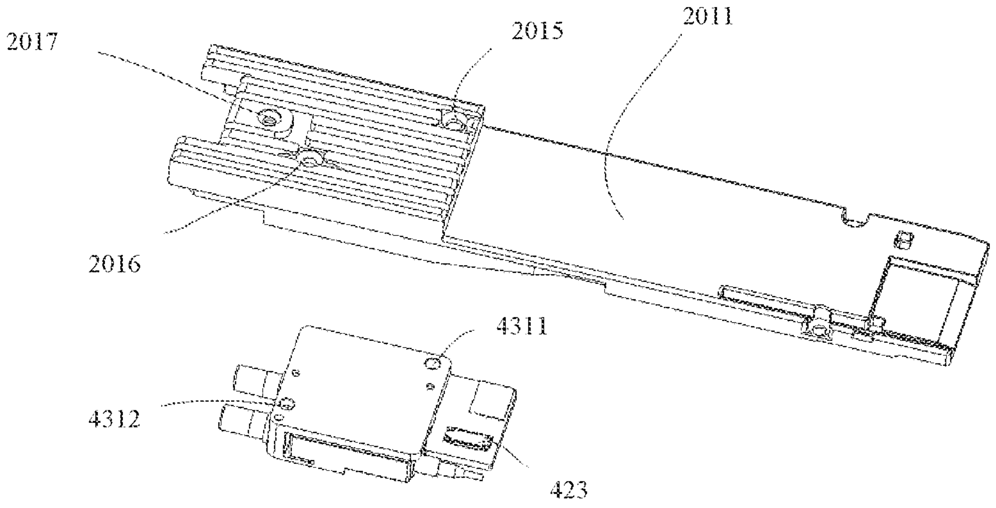
FIG. 15 is an exploded view of an upper shell and a fixing frame of an optical module, in accordance with some embodiments.

FIG. 14 is a structural diagram of an upper shell of an optical module from another perspective, in accordance with some embodiments; and FIG. 15 is an exploded view of an upper shell and a fixing frame of an optical module, in accordance with some embodiments.

In some embodiments, as shown in FIGS. 14 and 15, at least one of the first fixing hole 2015 and the second fixing hole 2016 includes a second threaded hole 20151 and a counterbore 20152. The second threaded hole 20151 has internal threads and is configured to be connected with a screw. The counterbore 20152 is located on a side of the second threaded hole 20151 away from the circuit board 300 and is communicated with the second threaded hole 20151. The counterbore 20152 is configured to accommodate a head of the screw. In this way, in a case where the screw is screwed into the first fixing hole 2015 or the second fixing hole 2016, the head of the screw may be located in the counterbore 20152 and is substantially coplanar with the surface of the cover plate 2011, so that it is conducive to improving the flatness of the optical module 200 and facilitating the connection between the optical module 200 and the master monitor.

In some embodiments, as shown in FIGS. 14 and 15, the upper shell 201 further includes a fifth fixing hole 2017. The fifth fixing hole 2017 runs through the cover plate 2011 along a thickness direction of the cover plate 2011. Moreover, the fifth fixing hole 2017 is disposed at a side of the bracket mounting groove 2014 proximate to the opening 205 and is disposed proximate to the opening 205. The fifth fixing hole 2017 is configured to fix the upper shell 201 and the lower shell 202. For example, a screw passes through the fifth fixing hole 2017 and a fixing hole in the lower shell 202, so that the fixation between the upper shell 201 and the lower shell 202 is implemented.

In some embodiments, in a width direction of the optical module, a distance between the fifth fixing hole 2017 and the first upper side plate 2012 is substantially equal to the distance between the fifth fixing hole 2017 and the second upper side plate 2013. In this way, in a case where the upper shell 201 and the lower shell 202 are fixed through the screw, the force on the upper shell 201 and the lower shell 202 is uniform, which facilitates assembly.

In some embodiments, the fifth fixing hole 2017 includes a counterbore and a second threaded hole. The structures of the counterbore and the second threaded hole are similar to those described above, and details will not be repeated herein.

Figure 16:
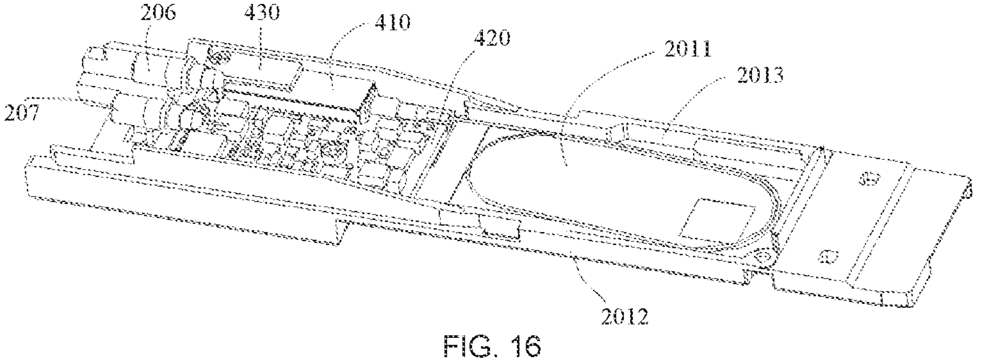
FIG. 16 is a structural diagram of an upper shell, a light source emitter and an optical fiber adapter of an optical module, in accordance with some embodiments.

FIG. 16 is a structural diagram of an upper shell, a light source emitter, and an optical fiber adapter of an optical module, in accordance with some embodiments.

In some embodiments, as shown in FIG. 16, the optical module 200 further includes a first optical fiber adapter 206 and a second optical fiber adapter 207 that are disposed between the fixing frame 430 and the circuit board 300 and located at the opening 205. The first optical fiber adapter 206 and the second optical fiber adapter 207 are configured to implement the optical signal transmission between the external optical fiber and the optical module 200. For example, the first optical fiber adapter 206 is disposed proximate to the light source emitter 410. The first optical fiber adapter 206 is connected to the modulation chip 460 through an optical fiber and configured to transmit the optical signal to the outside of the optical module 200.

In some embodiments, as shown in FIGS. 12 and 16, the bracket 432 further includes a first avoidance groove 4324. The first avoidance groove 4324 is disposed at a side of the supporting column 4321 proximate to the first optical fiber adapter 206 (i.e., the optical fiber adapter) and runs through the supporting column 4321 along the axial direction of the supporting column 4321. The first optical fiber adapter 206 is in contact with the first avoidance groove 4324. In this way, in a case where the first optical fiber adapter 206 is installed between the fixing frame 430 and the circuit board 300, the first avoidance groove 4324 may avoid the first optical fiber adapter 206 and may position the first optical fiber adapter 206, which is conducive to improving the stability of the first optical fiber adapter 206.

Figure 17:
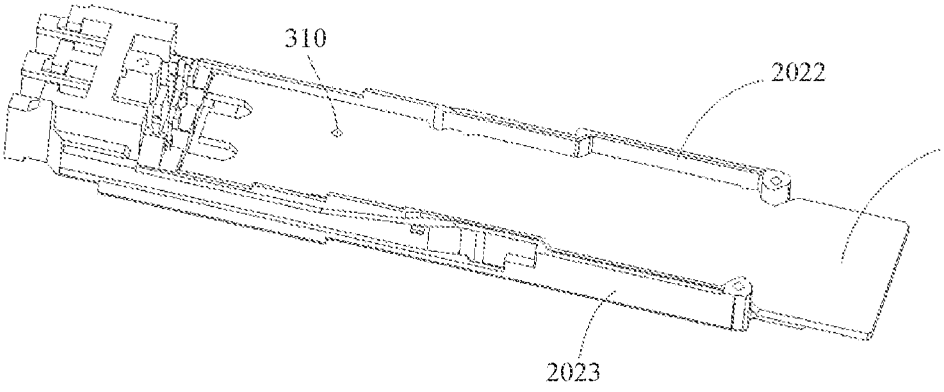
FIG. 17 is a structural diagram of a circuit board and a lower shell of an optical module, in accordance with some embodiments.
Figure 18:
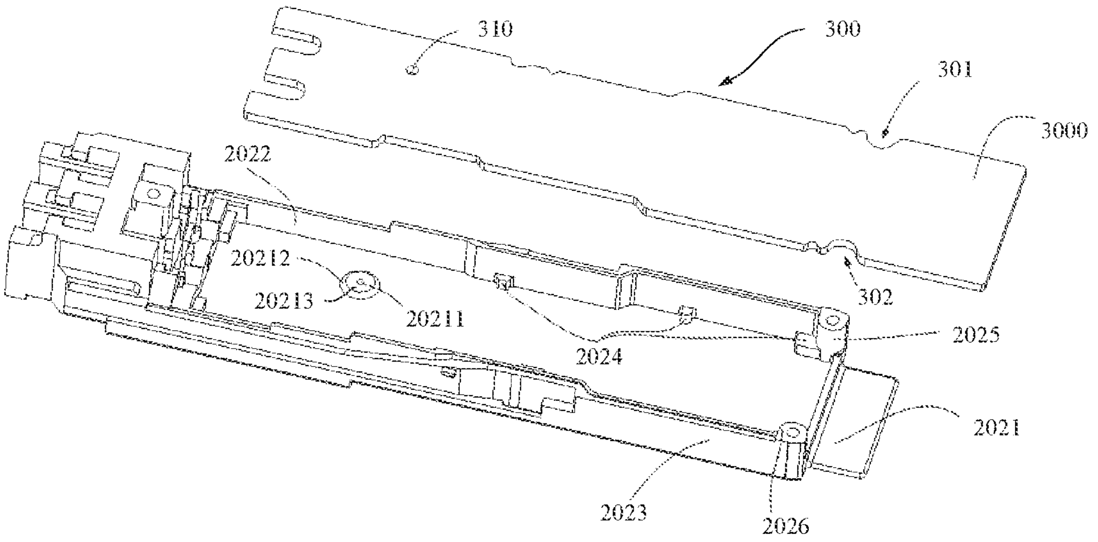
FIG. 18 is an exploded view of a circuit board and a lower shell of an optical module, in accordance with some embodiments.

FIG. 17 is a structural diagram of a circuit board and a lower shell of an optical module, in accordance with some embodiments; and FIG. 18 is an exploded view of a circuit board and a lower shell of an optical module, in accordance with some embodiments.

In some embodiments, as shown in FIGS. 17 and 18, the lower shell 202 includes a bottom plate 2021 and a first lower side plate 2022 and a second lower side plate 2023 that are located on two sides of the bottom plate 2021 and disposed perpendicular to the bottom plate 2021. The two upper side plates are matched (e.g., clamping or butting) with the two lower side plates, so that the upper shell 201 may cover the lower shell 202.

In some embodiments, as shown in FIG. 18, the lower shell 202 further includes a plurality of fixing bosses 2024. Distances between top surfaces of the plurality of fixing bosses 2024 and the bottom plate 2021 are equal to each other. The fixing boss 2024 is configured to support the circuit board 300. For example, the top surface of the fixing boss 2024 is in contact with the lower surface of the circuit board 300, so as to support the circuit board 300 and position the circuit board 300 in a thickness direction of the optical module 200.

In some embodiments, the fixing boss 2024 is disposed on the bottom plate 2021. For example, the fixing boss 2024 is disposed on the bottom plate 2021 and is connected to the lower side plate. Alternatively, the fixing boss 2024 is disposed on the bottom plate 2021 and spaced apart from a corresponding lower side plate.

In some embodiments, the fixing boss 2024 is disposed at an inner of the lower side plate and formed into a structure with a flat top surface, so as to support the circuit board 300.

It will be noted that shapes of the plurality of fixing bosses 2024 may be the same or different from each other, but the present disclosure is not limited thereto.

In some embodiments, the lower shell 202 further includes a first limiting column 2025 and a second limiting column 2026. The first limiting column 2025 is connected to an end of the first lower side plate 2022 proximate to the opening 204. The second limiting column 2026 is connected to the end of the second lower side plate 2023 proximate to the opening 204.

The circuit board 300 includes a circuit board body 3000, a third limiting opening 301, and a fourth limiting opening 302. The third limiting opening 301 and the fourth limiting opening 302 run through the circuit board body 3000 along a thickness direction of the circuit board body 3000 and are disposed oppositely on two sides of the circuit board body 3000 along a width direction of the circuit board body 3000. Positions of the third limiting opening 301 and the fourth limiting opening 302 correspond to positions of the first limiting column 2025 and the second limiting column 2026, respectively.

The first limiting column 2025 is disposed in the third limiting opening 301, and the second limiting column 2026 is disposed in the fourth limiting opening 302, so that the circuit board 300 may be installed and positioned in the lower shell 202 and may be positioned in the length direction of the optical module 200.

In some embodiments, as shown in FIG. 18, the bottom plate 2021 further includes a supporting boss 20212.

A distance between the supporting boss 20212 and the first lower side plate 2022 is substantially equal to a distance between the supporting boss 20212 and the second lower side plate 2023. The supporting boss 20212 protrudes relative to a top surface of the bottom plate 2021, and the supporting boss 20212 has a supporting surface 20213 in contact with a surface of the circuit board 300 proximate to the bottom plate 2021, so as to support the circuit board 300.

It can be understood that the installation of the circuit board 300 is facilitated by providing the supporting boss 20212 for supporting the circuit board 300 at the middle position of the bottom plate 2021, and the force on the circuit board 300 is uniform in the thickness direction of the optical module 200.

In some embodiments, the bottom plate 2021 further includes a fifth connecting through hole 20211 disposed in the supporting boss 20212 and run through the supporting boss 20212 along the thickness direction of the bottom plate 2021.

Referring to FIG. 17, the circuit board 300 includes a seventh fixing hole 310. A position of the seventh fixing hole 310 corresponds to a position of the fifth connecting through hole 20211 and runs through the circuit board body 3000 along the thickness direction of the circuit board body 3000. In this way, a screw passes through the seventh fixing hole 310 and the fifth connecting through hole 20211, so that the fixed connection between the circuit board 300 and the lower shell 202 may be achieved.

It can be understood that the lower surface of the circuit board 300 is provided with electronic components protruding from the lower surface. In this case, if the circuit board 300 is directly connected to the bottom plate 2021 through the screw, the electronic components on the lower surface may be damaged. Therefore, by providing the supporting boss 20212 protruding from the top surface of the bottom plate 2021 and providing the fifth connecting through hole 20211 for connecting to the circuit board 300 in the supporting boss 20212, it is possible to prevent damage to the electronic components on the lower surface while supporting the circuit board 300.

In some embodiments, the screw passes through the seventh fixing hole 310 and the fifth connecting through hole 20211 but does not protrude from the bottom surface of the bottom plate 2021. In this way, the flatness of the bottom surface of the bottom plate 2021 may be improved, and the connection between the optical module 200 and the master monitor is facilitated.

Figure 19:
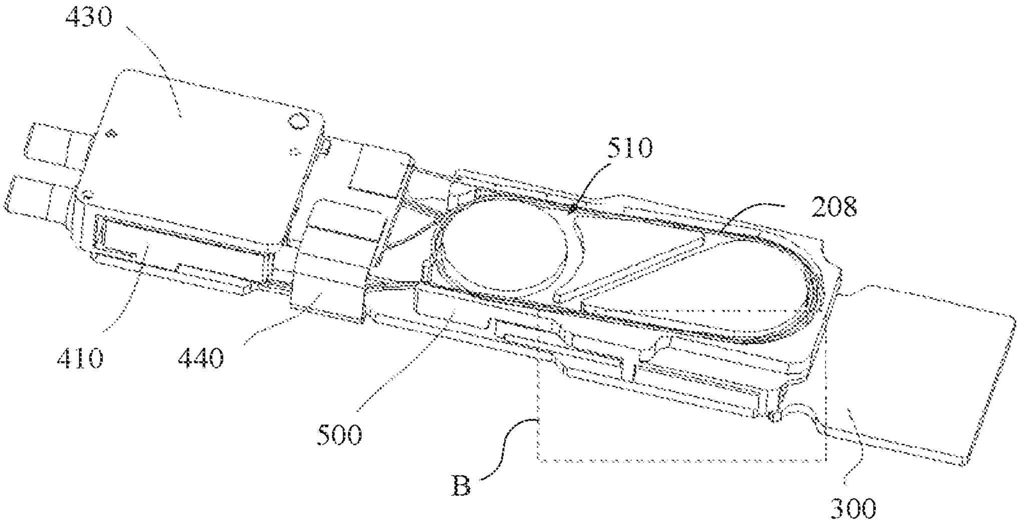
FIG. 19 is a structural diagram of a fixing frame, an optical fiber bracket and a circuit board of an optical module, in accordance with some embodiments.
Figure 20:
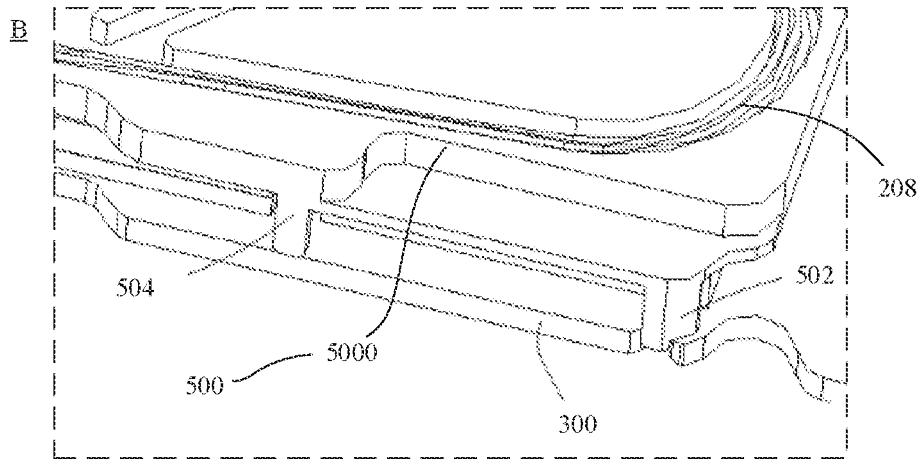
FIG. 20 is an enlarged view of box A in FIG. 19.
Figure 21:
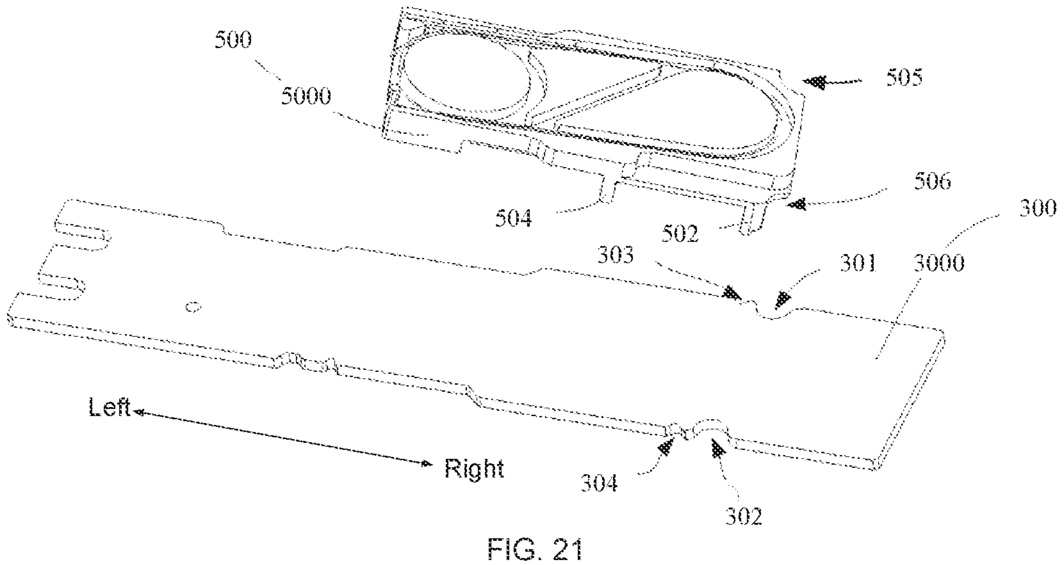
FIG. 21 is an exploded view of an optical fiber bracket and a circuit board of an optical module, in accordance with some embodiments.
Figure 22:
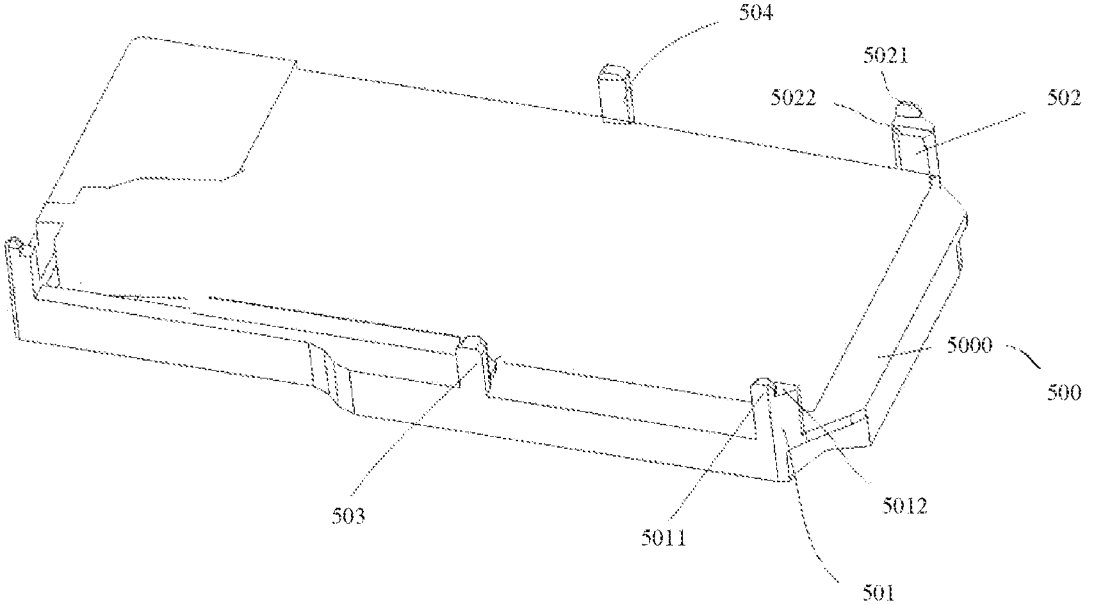
FIG. 22 is a structural diagram of an optical fiber bracket of an optical module, in accordance with some embodiments.

FIG. 19 is a structural diagram of a fixing frame, an optical fiber bracket and a circuit board of an optical module, in accordance with some embodiments; FIG. 20 is an enlarged view of box A in FIG. 19; FIG. 21 is an exploded view of an optical fiber bracket and a circuit board of an optical module, in accordance with some embodiments; and FIG. 22 is a structural diagram of an optical fiber bracket of an optical module, in accordance with some embodiments.

In some embodiments, as shown in FIG. 19, the optical module 200 further includes a plurality of optoelectronic devices and a plurality of second optical fibers 208. The plurality of optoelectronic devices are disposed inside the shell, and the plurality of second optical fibers 208 are configured to implement the light propagation between the plurality of optoelectronic devices.

In some embodiments, as shown in FIGS. 19 to 22, the optical module 200 further includes an optical fiber bracket 500 disposed above the circuit board 300 and configured to accommodate and fix the plurality of second optical fibers 208. For example, the optical fiber bracket 500 includes an optical fiber bracket body 5000 and an optical fiber groove 510. The optical fiber groove 510 is recessed from an upper surface of the optical fiber bracket body 5000 towards a lower surface of the optical fiber bracket body 5000. The plurality of second optical fibers 208 is fixed in the optical fiber groove 510.

It can be understood that, in order to facilitate the installation of the plurality of second optical fibers 208 and reduce the optical loss, lengths of the plurality of second optical fibers 208 are greater than distances between the plurality of optoelectronic devices. Therefore, it is convenient to fix the plurality of second optical fibers 208 by providing the optical fiber bracket in the optical module 200 for accommodating and fixing the plurality of second optical fibers 208.

In some embodiments, as shown in FIGS. 20 to 22, the optical fiber bracket 500 further includes a first limiting portion 501 and a second limiting portion 502. The first limiting portion 501 and the second limiting portion 502 are disposed oppositely on the lower surface of the optical fiber bracket body 5000 in the width direction of the optical module and extend from the lower surface of the optical fiber bracket body 5000 towards the bottom plate 2021. The first limiting portion 501 and the second limiting portion 502 are located at an end of the optical fiber bracket body 5000 proximate to the opening 204.

The circuit board 300 includes a first limiting opening 303 and a second limiting opening 304. A position of the first limiting opening 303 corresponds to a position of the first limiting portion 501, and the first limiting portion 501 is disposed in the first limiting opening 303. A position of the second limiting opening 304 corresponds to a position of the second limiting portion 502, and the second limiting portion 502 is disposed in the second limiting opening 304. In this way, the optical fiber bracket 500 may be installed and positioned on the circuit board 300.

In some embodiments, referring to FIG. 22, the first limiting portion 501 includes a first clamping portion 5011 (i.e., a clamping portion) and a first fixing surface 5012 (i.e., a fixing surface). The first fixing surface 5012 is in contact with the upper surface of the circuit board 300, so that the fixation of the optical fiber bracket 500 in the thickness direction of the optical module 200 may be achieved. That is, the optical fiber bracket 500 is limited from downward movement. The first clamping portion 5011 extends from the first fixing surface 5012 toward a direction proximate to the bottom plate 2021. The first clamping portion 5011 is disposed in the first limiting opening 303, so as to clamp with the circuit board 300, so that the fixation of the optical fiber bracket 500 in the length direction of the optical module 200 may be achieved.

In some embodiments, the second limiting portion 502 includes a second clamping portion 5021 (i.e., a clamping portion) and a second fixing surface 5022 (i.e., a fixing surface). The second fixing surface 5022 is in contact with the upper surface of the circuit board 300, so that the fixation of the optical fiber bracket 500 in the thickness direction of the optical module 200 may be achieved. That is, the optical fiber bracket 500 is limited from the downward movement.

The second clamping portion 5021 extends from the second fixing surface 5022 towards the direction proximate to the bottom plate 2021. The second clamping portion 5021 is disposed in the second limiting opening 304, so as to clamp with the circuit board 300, so that the fixation of the optical fiber bracket 500 in the length direction and the width direction of the optical module 200 may be achieved.

In some embodiments, as shown in FIGS. 21 and 22, the optical fiber bracket 500 further includes a first supporting portion 503 and a second supporting portion 504. The first supporting portion 503 and the second supporting portion 504 are disposed oppositely on the lower surface of the optical fiber bracket body 5000 and extend from the lower surface of the optical fiber bracket body 5000 towards the bottom plate 2021. Along a length direction of the circuit board 300 (i.e., a left-right direction as shown in FIG. 21), the first supporting portion 503 and the second supporting portion 504 are located substantially in the middle of the optical fiber bracket 500.

The first supporting portion 503 and the second supporting portion 504 are in contact with the upper surface of the circuit board 300, so that the optical fiber bracket 500 is fixed in the thickness direction of the optical module 200, which is conducive to improving the stability of the installation of the optical fiber bracket 500 on the circuit board 300.

For example, the first supporting portion 503 and the second supporting portion 504 each have a flat end surface, and the end surfaces abut against the upper surface of the circuit board 300, thereby improving the stability of the optical fiber bracket 500.

In some embodiments, along the thickness direction of the optical module 200, the end surfaces of the first supporting portion 503 and the second supporting portion 504 are substantially coplanar with the first fixing surface 5012 and the second fixing surface 5022, which may further improve the stability of the installation of the optical fiber bracket 500 on the circuit board 300.

In some embodiments, as shown in FIGS. 18 and 21, the optical fiber bracket 500 further includes a first mounting groove 505 and a second mounting groove 506. The first mounting groove 505 is disposed on the optical fiber bracket body 5000 and corresponds to the position of the third limiting opening 301 on the circuit board 300. The first limiting column 2025 is disposed in the first mounting groove 505. The second mounting groove 506 is disposed on the optical fiber bracket body 5000 and corresponds to the position of the fourth limiting opening 302 on the circuit board 300. The second limiting column 2026 is disposed in the second mounting groove 506. In this way, it may be possible to facilitate the positioning of the optical fiber bracket 500 in the lower shell 202 and improve the stability of the optical fiber bracket.

In some embodiments, the circuit board 300 is provided with a plurality of optoelectronic chips such as a digital signal processor (DSP). The optical fiber bracket 500 further includes a second avoidance groove, and a position of the second avoidance groove corresponds to the optoelectronic chip devices such as the digital signal processor. The optical fiber bracket 500 is covered above the digital signal processor, and the digital signal processor is located in the second avoidance groove, so that a distance between the optical fiber bracket 500 and the circuit board 300 may be shortened, and a space occupied by the optical fiber bracket 500 and the circuit board 300 may be reduced, which is conducive to the miniaturization of the optical module.

In some embodiments, the optical fiber bracket 500 further includes a first optical fiber groove disposed on the lower surface of the optical fiber bracket body 5000 and recessed towards the upper surface of the optical fiber bracket body 5000. The first optical fiber groove is configured to accommodate and fix the first optical fiber 450.

In some embodiments, the optical fiber bracket 500 and the fixing frame 430 are disposed above the circuit board 300, and the optical fiber bracket 500 is located at a side of the fixing frame 430. That is, an orthogonal projection of the optical fiber bracket 500 on the circuit board 300 is located outside an orthogonal projection of the fixing frame 430 on the circuit board 300. For example, the fixing frame 430 is located at a side of the circuit board 300 proximate to the opening 205, and the optical fiber bracket 500 is located at the side of the circuit board 300 proximate to the opening 204.

In some embodiments, an orthogonal projection of the fifth connecting through hole 20211 on the circuit board 300 is located outside the orthogonal projection of the optical fiber bracket 500 on the circuit board 300, and the fifth connecting through hole 20211 is closer to the opening 205 than the optical fiber bracket 500, thereby facilitating the installation of the circuit board 300 in the lower shell 202.

Figure 23:
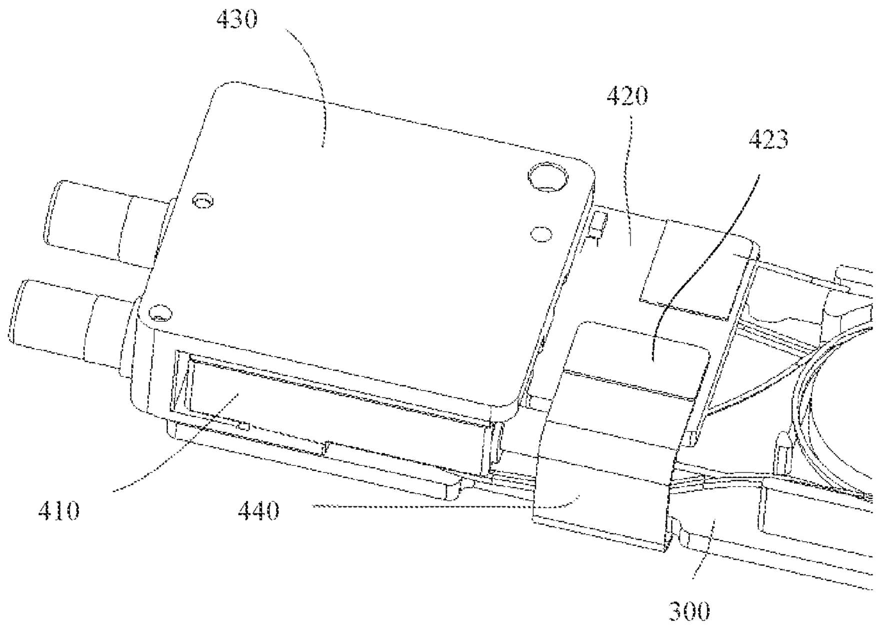
FIG. 23 is a partial structural diagram of an optical module, in accordance with some embodiments.
Figure 24:
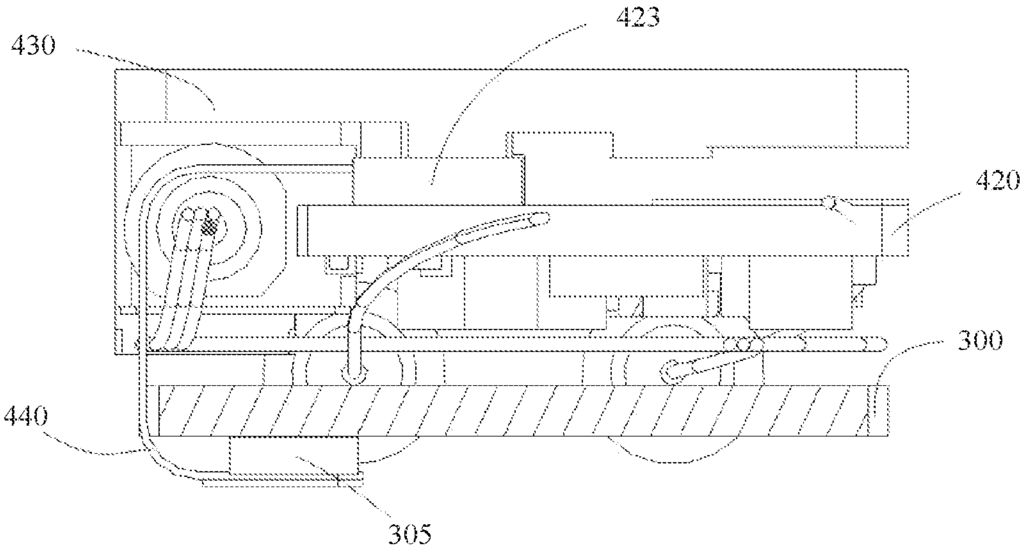
FIG. 24 is a cross-sectional diagram showing a partial structure of an optical module, in accordance with some embodiments.

FIG. 23 is a partial structural diagram of an optical module, in accordance with some embodiments; and FIG. 24 is a cross-sectional diagram showing a partial structure of an optical module, in accordance with some embodiments.

In some embodiments, as shown in FIGS. 23 and 24, the circuit sub-board 420 includes a first connector 423 connected to the circuit sub-board body 4200 and disposed on a side of the circuit sub-board body 4200 away from the circuit board. The first connector 423 includes a first opening open towards the second lower side plate 2023. In this way, the electrical connection between the first connector 423 and a flexible circuit board may be achieved through the first opening.

The circuit board 300 includes a second connector 305 connected to the circuit board body 3000 and disposed on a surface of the circuit board body 3000 away from the circuit sub-board 420. The second connector 305 includes a second opening open towards a same side as the first opening. For example, the second opening is open towards the second lower side plate 2023. The second connector 305 is electrically connected to the flexible circuit board through the second opening.

In this way, the circuit sub-board 420 may be electrically connected to the circuit board 300 through the flexible circuit board 440. The circuit board 300 is connected to the master monitor through the connecting finger, so as to receive the electrical signal from the master monitor. Then, the circuit board 300 transmits the electrical signal from the master monitor to the circuit sub-board 420 through the flexible circuit board 440. The circuit sub-board 420 transmits the electrical signal to the light source emitter 410 through the plurality of pins 411, so as to implement the signal transmission between the light source emitter 410 and the circuit board 300.

In some embodiments, an orthogonal projection of the first connector 423 on the circuit board 300 is located outside the orthogonal projection of the fixing frame 430 on the circuit board 300. In the length direction of the optical module 200, a position of the orthogonal projection of the first connector 423 on the circuit board 300 is substantially the same as a position of an orthogonal projection of the second connector 305 on the circuit board 300, thereby facilitating the installation of the flexible circuit board 440.

It can be understood that a gap between the lower surface of the circuit sub-board 420 and the upper surface of the circuit board 300 is small, which is not conducive to the arrangement of the first connector 423 and the second connector 305. Therefore, in some embodiments of the present disclosure, the second connector 305 is disposed on the lower surface of the circuit board 300, the first connector 423 is disposed on the upper surface of the circuit sub-board 420, and the first connector 423 and the second connector 305 have openings that open towards the second lower side plate 2023, so as to facilitate the installation of the flexible circuit board 440.

A person skilled in the art will understand that the scope of disclosure in the present disclosure is not limited to specific embodiments discussed above and may modify and substitute some elements of the embodiments without departing from the spirits of this application. The scope of this application is limited by the appended claims.

What is claimed is:

1. An optical module, comprising:

an upper shell;

a lower shell covered with the upper shell to form a mounting cavity;

a circuit board disposed in the mounting cavity;

a light source mounting portion fixedly connected to the upper shell;

a supporting column located at a side of the light source mounting portion proximate to the lower shell and connected to the light source mounting portion;

a pressing plate, the pressing plate being closer to the lower shell than the light source mounting portion; and including:

a first connecting portion connected to the supporting column; and a second connecting portion connected to the first connecting portion, and the second connecting portion being closer to the upper shell than the first connecting portion;

a light source emitter disposed between the second connecting portion and the light source mounting portion, a fixing portion located at a side of the light source mounting portion and connected to the light source mounting portion; and a circuit sub-board disposed at a side of the circuit board proximate to the upper shell and disposed in the fixing portion; the circuit sub-board being electrically connected to the circuit board and the light source emitter.

2. The optical module according to claim 1, further comprising a spacer disposed between the light source emitter and the second connecting portion.

3. The optical module according to claim 1, wherein the circuit sub-board includes:

a circuit sub-board body; and an avoidance portion disposed at a side of the circuit sub-board body proximate to the light source emitter and configured to position and avoid the light source emitter;

wherein the light source emitter is disposed in the avoidance portion; the light source emitter includes a plurality of pins, and the light source emitter is electrically connected to the circuit sub-board through the plurality of pins.

4. The optical module according to claim 3, wherein the circuit sub-board further includes a plurality of electronic components disposed on the circuit sub-board body;

the fixing portion includes a plurality of recessed portions; positions of the plurality of recessed portions correspond to positions of the plurality of electronic components and are configured to avoid the plurality of electronic components.

5. The optical module according to claim 1, wherein the upper shell includes;

a cover plate;

a bracket mounting groove disposed on a side of the cover plate proximate to the lower shell and configured to position the fixing portion; and at least one fixing hole disposed in the bracket mounting groove;

wherein the fixing portion includes at least one connecting through hole connected to the at least one fixing hole through a fastener.

6. The optical module according to claim 1, wherein the light source emitter is configured to emit a light beam; and the optical module further comprises:

a first optical fiber; and a modulation chip connected to the light source emitter through the first optical fiber and configured to load a signal into the light beam emitted by the light source emitter, so as to form an optical signal.

7. The optical module according to claim 6, further comprising an optical fiber adapter connected to the modulation chip;

wherein the supporting column includes a first avoidance groove, and a position of the first avoidance groove corresponds to a position of the optical fiber adapter; an inner contour of the first avoidance groove is matched with an outer contour of the optical fiber adapter, and the first avoidance groove is configured to avoid and position the optical fiber adapter.

8. The optical module according to claim 1, further comprising:

a second optical fiber; and an optical fiber bracket disposed at the side of the circuit board proximate to the upper shell; the optical fiber bracket including:

an optical fiber bracket body;

an optical fiber groove recessed from an upper surface of the optical fiber bracket body toward a lower surface of the optical fiber bracket body and configured to accommodate and fix the second optical fiber;

a first limiting portion; and a second limiting portion; the first limiting portion and the second limiting portion being disposed oppositely, on the lower surface of the optical fiber bracket body, in a width direction of the optical module and extending from the lower surface of the optical fiber bracket body towards the lower shell;

wherein the circuit board includes:

a first limiting opening corresponding to a position of the first limiting portion, and the first limiting portion being disposed in the first limiting opening; and a second limiting opening corresponds to a position of the second limiting portion, and the second limiting portion being disposed in the second limiting opening.

* * * * *